(12) United States Patent
Heath

(10) Patent No.: X9673
(45) Date of Patent: May 23, 1836

(54) TANNING

(76) Inventor: Simeon Heath

Simeon Heath.

Letters Patent.

The Schedule referred to in these Letters Patent, and in
making part of the same, containing a description in the words of
the said Simeon Heath himself, of his Improvement in the Process of
Tanning.

Be it known that I Simeon Heath, of the town of Pike,
in the County of Allegany, and State of New York, have made a
new and useful discovery in the process of tanning hides and
skins, called "Heaths improved process in tanning"; which is
described as follows.- The hides and skins are first prepared in the
usual manner. I then make a strong bark liquor by leaching-
My discovery consists in the addition to the liquor as above of
Nitre and alum, or Epsom or Rochelle salts, or some other neutral
salts in the following proportion namely- for a dozen skins I use
from two to five pounds of alum & 3/4 lb salts mixed with the
liquor or added separately in such proportion according to
the strength of the liquor. as often as the bark liquor is renewed
a similar or a smaller quantity of this preparation may be
applied as the strength of the liquor may require it. By this
process skins which have heretofore required from three to
six months may now be tanned in as many days, & hides
in the same proportion of time according to their thickness.

Witnesses
Wm P. Elliot
Clement T. Coote

Simeon Heath

Exd
[illegible]

252 words)

Drw Not necessary (Granted May 23. 1836.)

United States Patent

Patent No.: X9673

Isaac Knight, Letters Patent granted, dated March 19. 1829.
Reissued tenth day of July 1834 & Re-Reissued
April 28. 1836. — Having for Impt. in the
Rail road carriage — Recorded in volume
— 8th — page 105 — of Restored Records.

Isaac Knight
Letters Patent

The schedule referred to in these Letters Patent and making part of the same containing a description in the words of the said Isaac Knight himself of his improvement in the mode of constructing stores and other buildings ---
A Specification of an improvement in building houses invented by Isaac Knight of the City of Baltimore which improvement he believes to be new and useful and for which he asks a patent: My leading object is to introduce a mode of building storehouses more suited to the present state of our cities: by making the exterior of the building really fire proof. The means he proposes for doing this is to construct the front principally of cast iron. with an earthen roof, or an incombustible covering for the attick floor. Such building being so constructed that the cost will be little or no more than upon the present plan. The principle objection made to cast iron in connection with masonry has been the expansion and contraction of the metal. To prevent it is beyond the reach of art: all that can be done is to avoid the bad effects of it which he proposes to do. Granite pillars are found not to answer in case of fire as when they become hot they burst asunder, and the building falls. Instead of granite he makes the pillars of cast iron. hollow with three sides generally about 3/4 inch thick. the inner side to be open but with flanges. on the corners turned nearly in the form of the letter E: so that they may be built up sollid with brick or soap stone to within one inch of the top of the cast iron case. then he places a block of cast iron which may be about two inches in thickness made to fit the inside of the top of the case and on the brick work so the whole weight will rest upon the brick within the pillar pillar and leave a space of about one inch free to give room for
the metal of the case to expand and contract. The cap of the
pillar must have flanges extending down the outside of the
pillars two or three inches so as to receive the top of the
cast iron case or pillar. The lintel or bressummer which
rests on the cap of the pillar he also forms of cast iron with a
front and bottom nearly in the form of the letter L. the
front above 9 inches in width and one inch in thickness. the bot
tom one inch thick and one foot wide. There must be a
flange at the top to throw the water off. This may also be
filled with brick. and when it is intended that the joists
are to rest on these lintels or bressummers and run from front
to back of the house he then casts a crotch or chair on the in-
side of the lintel to receive and hold the joists and tie the build-
ing. The second story he forms in the same manner as the
first, if it is intended to have the whole space between the
pillars taken up with doors and windows as below, but if
not he then makes the pillars of about one half the size of
those in the first story. say six inches front by 12 or 18 in
depth; and places two above for one below. also filled with
bricks. and with a block of cast iron on there top to
accomodate the expansion as before stated and so arrang-
ed as that they will answer for the door and window frams
and the space between these pillars. and doors or windows
which are called piers. and the space below the windows
he also closes up with plates of cast iron of about ½ inch in
thickness and of sufficient length and breadth to fit in
grooves which are cast for that purpose in the pillars;
these cast iron plates may be made to give the appearance
of pannel work or other wise ornamented according to fancy)
The 3d & 4th story is also formed of cast iron in the same
manner; the window shutters ought to be of rolled iron
as also the doors which should be made to move upon
pivot pivot hinges steeled at there bottoms or he sometimes places
the doors in grooves in such a way that they will slide up
and down in them by means of a ballance weight passing
over pulleys. The roof he in general makes nearly flat with-
out rafters, but places joists on the walls nearly similar to
the floor joists, on these joists he puts a floor of rough boards
then a layer of Roman Cement in which he lays a pave-
ment of pressed brick of about two inches in thickness the
joints very small and well filled with water cement liqued
lead or other suitable materials which if properly done
will cement the whole together water tight. then over this pave-
ment of brick so cemented together with lead or otherwise
he puts several coats of tar well mixed with ashes lime clay or
fine sand in sufficient quantity to render the tar incom-
bustible, upon this plan a reservoir if required may be for-
med upon the roof of the house to hold the water falling upon
it. This may be done by raising the coping - stones of the
wall (which stone constitute the outer edge of the roof) to
allow these stones to project a few inches above or higher than
the pavement of the roof so as to confine the water which may
fall on it, and which may be drawn off at pleasure by
means of spouts with valves fixed near the roof having wires at-
tached to them, by which they are opened which wires ex
tend down to a convenient discharging place in the
spout, there ought to be a pallisading of cast iron fixed
in the coping stones of the wall both for ornament and safety.
Another mode of securing the house from fire is this. if it
be not desired to have a roof of the kind last described or
which will not be entirely fire proof. he then puts one
or more courses of bricks between the top of the joists of the
upper or garret floor and the plate of wood on which the
foot of the rafters are secured and then to lay a pavement
of brick with suitable cement or some other incombusti-
ble ble material over the garret floor, so as that no fire can be communicated from the roof of the floor or joist, and thus in case the roof should take fire and burn off, the other parts of the building would be safe. (There ought to be an iron trap door over the stair (way)) this would add greatly to the security of property in store houses, and at very small cost and might be applied to houses already built with wooden roofs. What I claim as new in my improved mode of building stores and similar structures is the rendering them wholly or in great degree fire proof, in the manner herein described, that is to say, the constructing the colums which support the front in part of brick or some similar material and in part of cast iron, allowing the weight to rest upon cast iron blocks placed in the iron case and on the brick in such a way that the iron forming the sides may expand and contract freely by changes of temperature, the superincumbent weight being borne by the brick &c which form the interior of the colum. My claim is to the manner of allowing the iron case to expand and contract as herein set forth. I also claim the manner of forming the front of the house above the colums as herein before set forth. I also claim the forming of the roof with thin paving brick cemented together in the way described and in connection with a covering upon this brick pavement of tar sand ashes or lime or some similar compound. I likewise claim the covering the upper floor with brick or some other incombustible substance in connection with there being also two or more courses of brick laid above the joists of the floor so as to elevate the raising plate upon which the rafters rests and prevent its having any communication by combustible materials with the joists or floor so that the roof might burn off without endangering the lower parts of the building, care being always taken to close the head of the stair way or the opening into the loft by a metal door. Isaac Knight Witnesses. Gilbert S. Gibenson. Saml. Stettinus [1548 wds Patent Joel Houston Anson Hinman and Jonas Ingraham
Letters Patent The schedule referred to in these Letters Patent and making part of the same containing a description in the words of the said Joel Houston, Anson Hinman, and Jonas Ingraham themselves of their improvement in the Dry Docks To all to whom these presents shall come. Joel Houston Anson Hinman and Jonas Ingraham of the City of Buffalo, County of Erie and State of New York send greeting. Be it known that we the said Joel Houston Anson Hinman and Jonas Ingraham have invented a new and useful improvement, not known or used before in the making of a newly constructed Dry Dock by which a very important advantage is gained over the dry docks or rail ways now in use for repairing vessels, boats or other naval craft. This improvement consists in having a large reservoir placed a convenient distance from the sides of the lock the floor or bottom, of which reservoir, to be on a level with the top or coping of the sides of the lock, and which reservoir is to be filled. by means of a pump from the water below or on the floor of the lock; From the side of said reservoir is a conductor or penstock, leading the water from the reservoir into the lock, to raise the vessel high enough to float the same on the cradle, after the vessel shall have been brought on the centre of the cradle. The cradle is composed of a centre stationary block and slide blocks which are movable with a hand inserted in the outer ends of each slide block to operated in rag teeth, The flood gates are then to be hoisted which draws the water from the cradle and leaves the vessel and cradle dry.: While the vessel is repairing the reservoir is to be filled again after the vessel is repaired. the gates are to be closed and the lock is to be filled by taking the water from the reservoir by means of the penstock as before, fore sufficient to float the vessel from the cradle into the lock. then by hoisting the flow gates, the vessel lowers down, by which time the lock gates are open and the vessel set afloat.

We claim the invention of a new principle in the application of an elevated reservoir, to be filled with water and to be used in raising or letting down vessels boats or other craft as an improvement upon the method of raising vessels heretofore used. also the improvement of the slide blocks by means of a hand, in each slide block dropping into rag teeth set in a groove. In witness whereof ~~we~~ we have hereunto ~~set~~ subscribed our names the eleventh day of January A.D. 1836.

Witnesses
Rowel Chapin
A.H. Palmer

Joel Houston
Anson Hinman
Jonas Ingraham

Exd.
W.H.

Drawing 473 wds